(12) United States Patent
Tsai

(10) Patent No.: US 7,191,733 B2
(45) Date of Patent: Mar. 20, 2007

(54) DOOR LATCH DEVICE FOR PET CAGES

(76) Inventor: Pei-Ju Tsai, No. 11, Lane 58, Yong-an St., Fongyuan City, Taichung County 420 (TW)

( * ) Notice: Subject to any disclaimer, the term of this patent is extended or adjusted under 35 U.S.C. 154(b) by 129 days.

(21) Appl. No.: 11/136,580

(22) Filed: May 24, 2005

(65) Prior Publication Data

US 2006/0266298 A1    Nov. 30, 2006

(51) Int. Cl.
*A01K 31/10*   (2006.01)
*A01K 1/02*    (2006.01)

(52) U.S. Cl. ........................ 119/481; 119/501

(58) Field of Classification Search ............... 119/481, 119/501, 452, 453, 459, 472, 474, 482, 484, 119/483, 496, 498
See application file for complete search history.

(56) References Cited

U.S. PATENT DOCUMENTS 2,785,917 A * 3/1957 Reed .......................... 292/210
3,499,674 A * 3/1970 Burkholder et al. .......... 292/87
3,862,620 A * 1/1975 Bernhard et al. ........... 119/481

FOREIGN PATENT DOCUMENTS

GB     2183983 A  *  6/1987
JP     2002317579 A * 10/2002
JP     2006217867 A *  8/2006

* cited by examiner

*Primary Examiner*—Son T. Nguyen
(74) *Attorney, Agent, or Firm*—Charles E. Baxley

(57) ABSTRACT

A latch device for a pet cage includes a latch member connected to outside of the door and includes an insertion with a hole and a lever. A positioning member includes a board fixed on the cage and located below the opening. A flexible plate extends from the board and a gap is defined between the board and the flexible plate. A tongue extends from the board and toward the flexible plate. The insertion of the latch member is inserted in the gap and the tongue is engaged with the hole to prevent the door from being lifted upward to open. The user may pull the lever to push the flexible plate away from the board to disengage the tongue from the hole so that the door can be lifted upward.

2 Claims, 4 Drawing Sheets

DOOR LATCH DEVICE FOR PET CAGES

FIELD OF THE INVENTION

The present invention relates to a latch device for pet cages and the latch device is easily operated for the users while the pets cannot open the door.

BACKGROUND OF THE INVENTION

A conventional pet cage for birds generally includes a door which is locked by a pin extending through a tubular member or a ring on the cage. The door can be opened by removing the pin from the ring. However, some birds have the ability to remove the pin away from the ring and the birds escape from the cages. This is one of the concerns for the users. If the door latch device is a complicated mechanism which the birds cannot open it, the users have to take time to unlatch it and the complicated latch device will be expensive which is not welcomed in the market.

The present invention intends to provide a latch device for a get cage and the latch device includes an insertion with a lever and a flexible positioning member which can be easily deformed to allow the latch to be disengaged from a tongue on the positioning member. The lever cannot be reached by the pets so that the door cannot be opened by the pets.

SUMMARY OF THE INVENTION

The present invention relates to a pet cage that comprises an opening and a door is pivotably connected to the cage to close the opening. A latch member is connected to an outside of the door and includes an insertion having a hole and a lever which extends from the insertion at an angle. A positioning member has a board fixed on the cage and is located below the opening. A flexible plate extends from the board and a gap is defined between the board and the flexible plate. A tongue extends from the board and toward the flexible plate. The insertion of the latch member is inserted in the gap and the tongue is engaged with the hole to lock the door. The flexible plate is pushed away from the board to disengage the tongue from the hole to unlatch the door.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
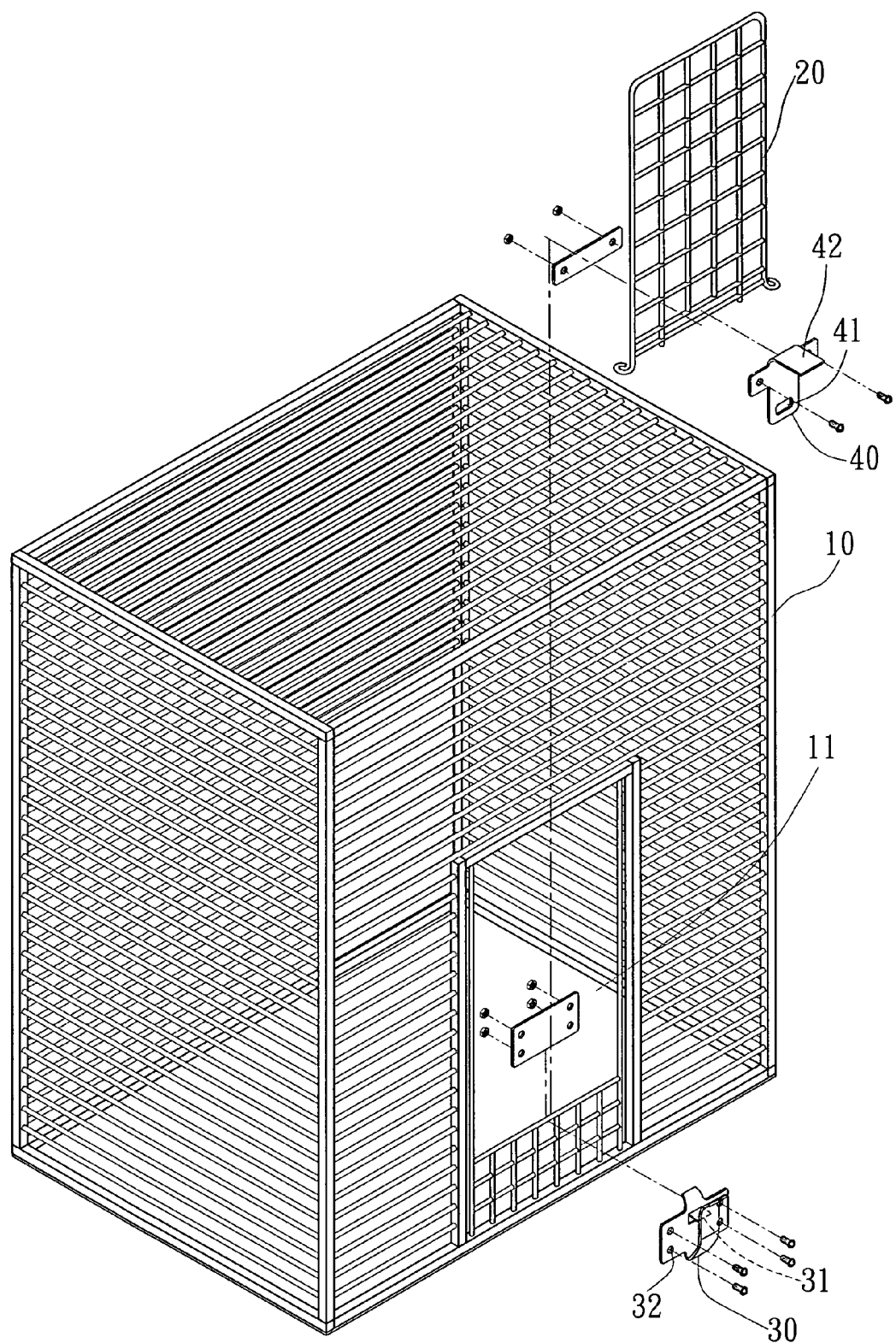
FIG. 1 is an exploded view to show the pet cage, the door and the latch device of the present invention.

Referring to FIGS. 1, 2, 4 and 5, the pet cage 10 of the present invention comprises an opening 11 and a door 20 is pivotably connected to the cage 10 so as to close the opening 11 to prevent pets in the cage 10 from escaping from the opening 11. A latch member 40 is connected to an outside of the door 20 by a positioning plate which is located at inside of the door 20 and bolts extend through the latch member 40, the positioning plate and are connected with nuts. The latch member 40 includes an insertion and a lever 42, the insertion has a hole 41 and is located in parallel with an outside of the door 20, and the lever 42 extends from the insertion at an angle.

A positioning member is fixed to the cage 10 and located below the opening 11. The positioning member includes a board which includes four connection holes 32 and a plate 60 is located inside the pet cage 10. Bolts 50 extend through the connection holes 32 and the plate 60 and are fastened with nuts to fix the positioning member on the cage 10. A flexible plate 30 extends from a lower end of the board and a gap is defined between the board and the flexible plate 30. A tongue 31 extends from the board and toward the flexible plate 30.

Figure 2:
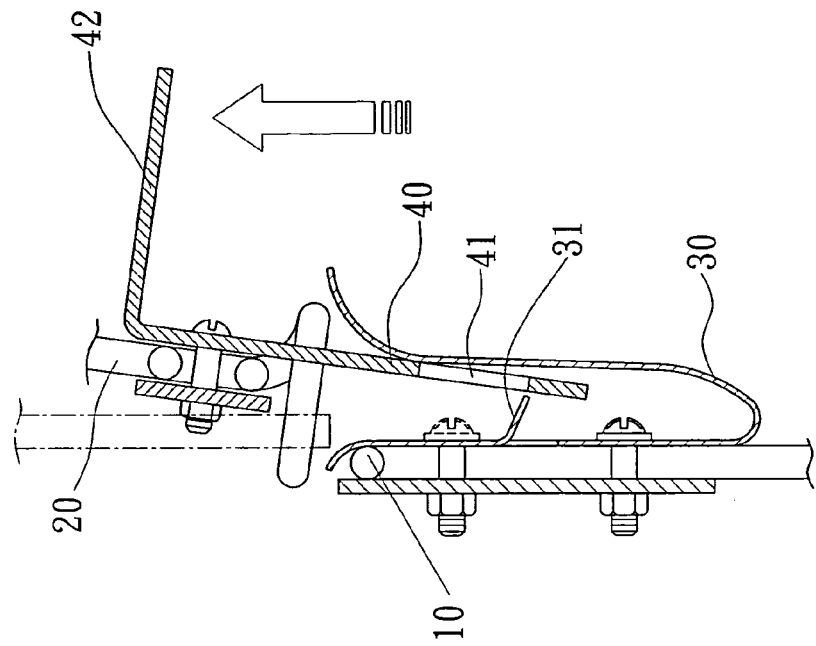
FIG. 2 is a side cross sectional view to show that the latch device is in latched position.
Figure 3:
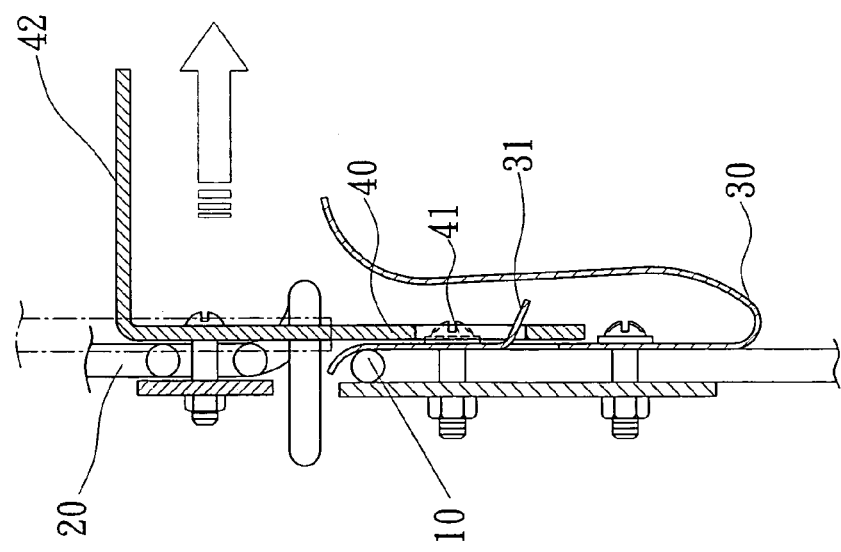
FIG. 3 is a side cross sectional view to show that the latch device is unlatched by pulling the lever to deform the flexible plate.
Figure 4:
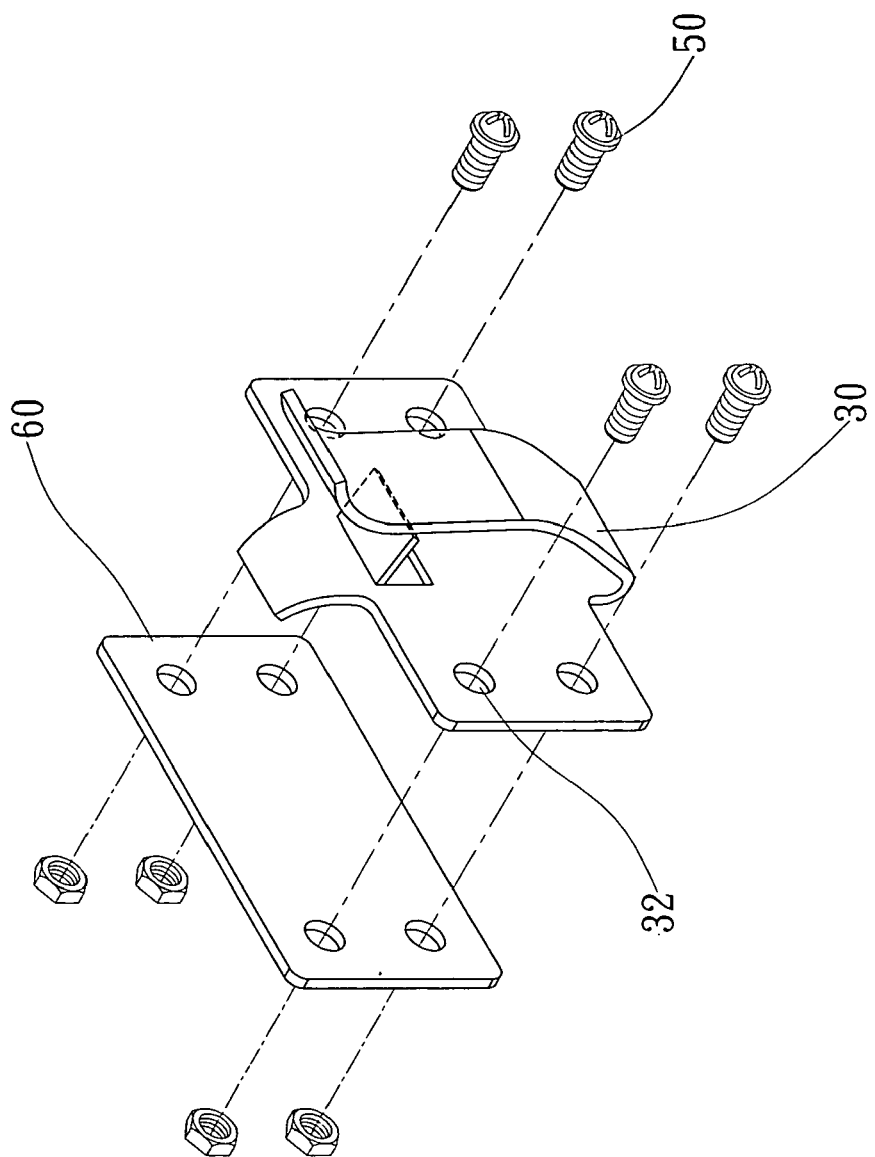
FIG. 4 shows the positioning member and the plate for connecting the positioning member on the cage.
Figure 5:
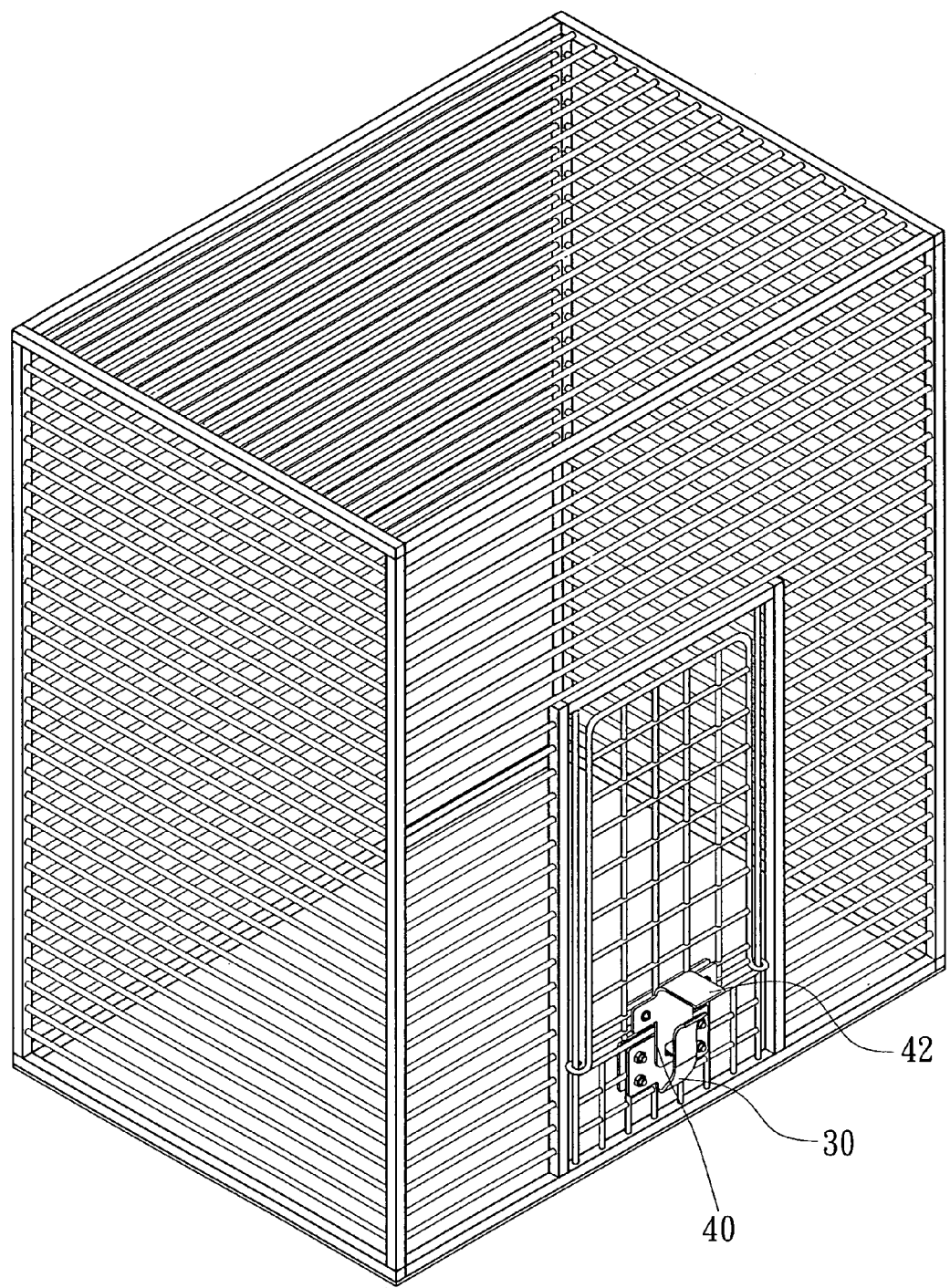
FIG. 5 is a perspective view of the pet cage wherein the door is in close position by the latch device.

As shown in FIGS. 2 and 3, when lock the door 20, the insertion of the latch member 40 is inserted in the gap and the tongue 31 is engaged with the hole 41. The door 20 cannot be lifted upward because of the tongue 31. When the door 20 is to be opened, the user may pull the lever 42 away from the cage 10 and the flexible plate 30 pushed away from the board by the insertion and the tongue 31 is disengaged from the hole 41, so that the door 20 can be lifted to open.

The processes to open the door 20 is easily to operate and can be made by one hand, and the structure of the latch device is simple and reliable. The action to push the flexible plate 30 by the insertion of the latch member 40 is difficult to complete for the pets such as birds in the cage 10.

While we have shown and described the embodiment in accordance with the present invention, it should be clear to those skilled in the art that further embodiments may be made without departing from the scope of the present invention.

What is claimed is:

1. A pet cage comprising:
   an opening and a door is pivotably connected to the cage and closing the opening, a latch member connected to an outside of the door and having an insertion and a lever, the insertion having a hole and located in parallel with an outside of the door, the lever extending from the insertion at an angle, and
   a positioning member having a board fixed on the cage and located below the opening, a flexible plate extending from the board and a gap defined between the board and the flexible plate, a tongue extending from the board and toward the flexible plate, the insertion of the latch member inserted in the gap and the tongue engaged with the hole, the flexible plate being pushed away from the board to disengage the tongue from the hole.

2. The pet cage as claimed in claim 1, wherein the board includes connection holes and a plate is located inside the pet cage and bolts extend through the connection holes and the plate and are fastened with nuts to fix the positioning member on the cage.

* * * * *